Nov. 24, 1953 R. J. HASTINGS 2,660,109
MACHINE FOR THE MANUFACTURE OF CRUMPETS AND THE LIKE
Filed June 14, 1948 4 Sheets-Sheet 1

Inventor
ROBERT JAMES HASTINGS
By
Attorneys

Nov. 24, 1953      R. J. HASTINGS      2,660,109
MACHINE FOR THE MANUFACTURE OF CRUMPETS AND THE LIKE
Filed June 14, 1948      4 Sheets-Sheet 2
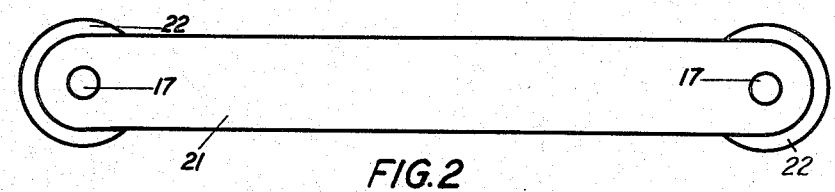
FIG. 2
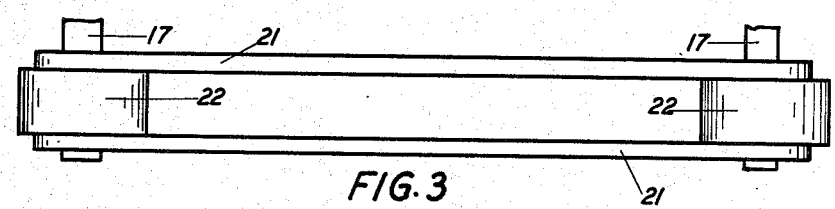
FIG. 3
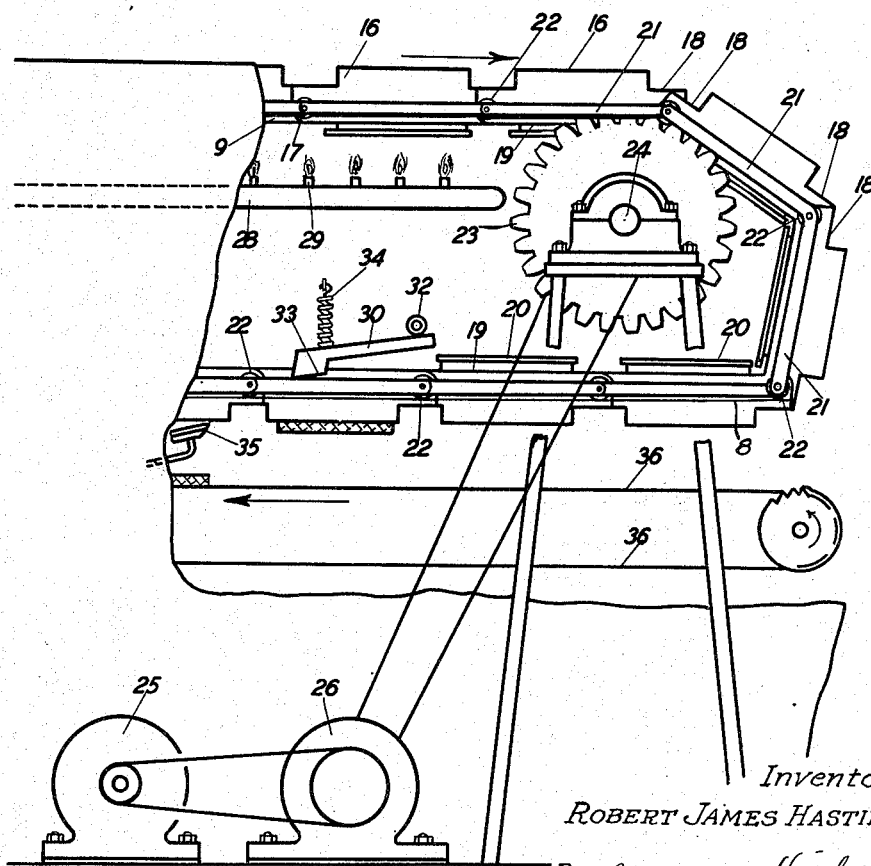
FIG. 1 (CONT<sup>D</sup>)
Inventor
ROBERT JAMES HASTINGS
By
Attorneys Nov. 24, 1953  R. J. HASTINGS  2,660,109
MACHINE FOR THE MANUFACTURE OF CRUMPETS AND THE LIKE
Filed June 14, 1948  4 Sheets-Sheet 3

Inventor
ROBERT JAMES HASTINGS

By *Rackenbach & Hirschman*
Attorneys

Nov. 24, 1953  R. J. HASTINGS  2,660,109
MACHINE FOR THE MANUFACTURE OF CRUMPETS AND THE LIKE
Filed June 14, 1948  4 Sheets-Sheet 4

*Inventor*
ROBERT JAMES HASTINGS
By *Rackenbach & Hirselman*
*Attorneys*

Patented Nov. 24, 1953

2,660,109

UNITED STATES PATENT OFFICE 2,660,109

MACHINE FOR THE MANUFACTURE OF CRUMPETS AND THE LIKE

Robert James Hastings, Yagoona, New South Wales, Australia

Application June 14, 1948, Serial No. 32,869

7 Claims. (Cl. 99—423)

This invention relates to improvements in the manufacture of crumpets and the like, wherein dough measuring and dispensing means are adapted to work in conjunction with continuous cycle baking and delivering means.

An object of the present invention is to provide a machine of the above type which is of simple construction and which may be operated by comparatively unskilled labour.

A further object of the present invention is to provide in a machine of the above type means for effecting efficient baking of the crumpets, thus eliminating the possibility of over or under baking.

A still further object of the present invention is to provide in a machine of the above type, mechanical means for removing the baked crumpets from their respective moulds and causing them to fall on to suitable delivery means.

In the present invention, dough dispensing means are suitably arranged beneath a dough "hopper," to receive dough therefrom at regular intervals for distribution to crumpet moulds, the said dispensing means being formed in such a way that a predetermined quantity of dough is delivered to each of a series of moulds instantaneously. In one form of the invention, the crumpet moulds are adjacently mounted in "banks" of three and are interconnected by pin means or the like, the said pin means being adapted to cooperate with the respective links of a pair of endless chains which are driven through a suitable reduction gear box from a known electric motor, and the various banks of moulds are carried thereby over baking means such as gas jets or the like until the contents of the said moulds are thoroughly baked, when the said contents or "crumpets" are ejected on to a conveyor and directed to a packing room.

In order that the invention may be more readily understood, reference will now be made to the accompanying drawings wherein—

Figure 2 is a side elevational view of one unit of the link and roller chain mechanism used as the chain drive of the machine and to which the moulds are attached.

Figure 3 is a plan view thereof.

Figure 8:
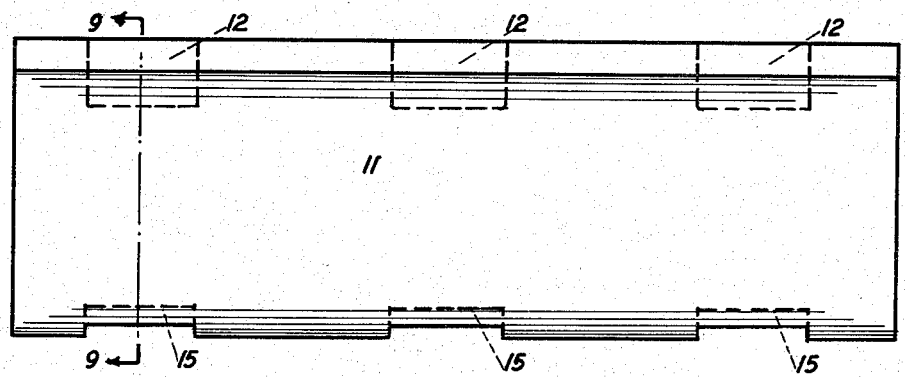
Figure 8 is a side elevational view of the dough dispensing means according to the present invention.
Figure 9:
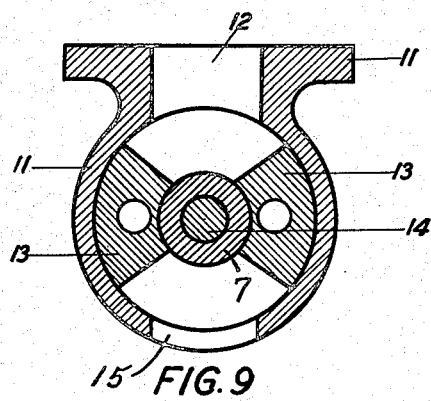
Figure 9 is a sectional elevation on the line 9—9 of Figure 8.

According to the present invention a dough hopper 10 having holes (not shown) in the bottom thereof, has secured thereto dough dispensing means having a casing 11 which has formed therein a series of inlet ports 12, see Figures 8 and 9, for receiving dough through the said holes from the hopper 10, and the dough portions thus received in the casing 11 of the dispensing means are carried in pockets in a distributing member 13 having a hub 7 mounted on a shaft 14 within the said dispensing means, and thence for discharge to outlet ports 15 formed in the said casing 11, see Figure 9, the said shaft 14 being mounted in bearings of known form and being driven in a manner to be explained.

Figure 6:
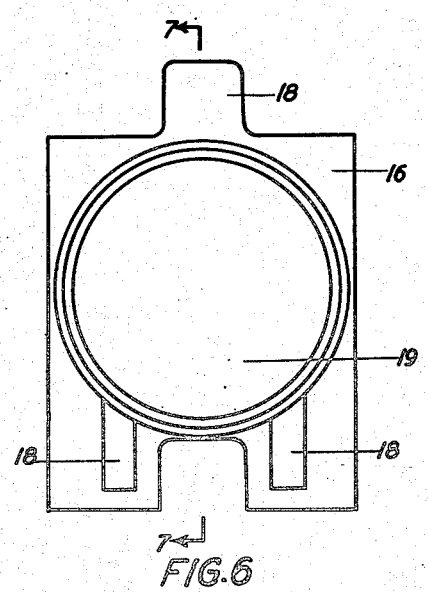
Figure 6 is a plan view of a crumpet mould assembly according to the present invention but turned through 90° to the position of normal operation.
Figure 7:
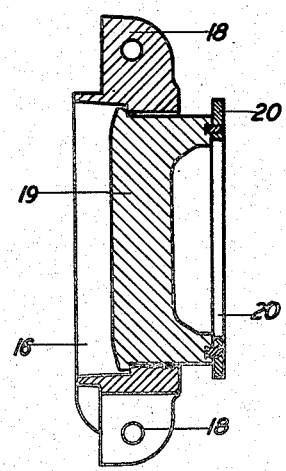
Figure 7 is a sectional elevation on the line 7—7 of Figure 6.

Crumpet moulds 16 pass beneath the dispensing means 11 and receive dough portions from the outlet ports 15 thereof, the said crumpet moulds 16 being connected, for example, in banks of three by pins 17 which pass through lugs 18 formed integral with the said moulds 16. The body portion of each of the moulds 16 slideably receives a valve portion 19 upon which the dough portion falls from the dispenser 11, and a flange 20 is secured to the said valve portion 19 for reasons to be explained later, see Figures 1, 6 and 7. Said valve portion 19 has movement in mould 16 limited by means of an annular flange which engages a shoulder in the mould.

Figure 1:
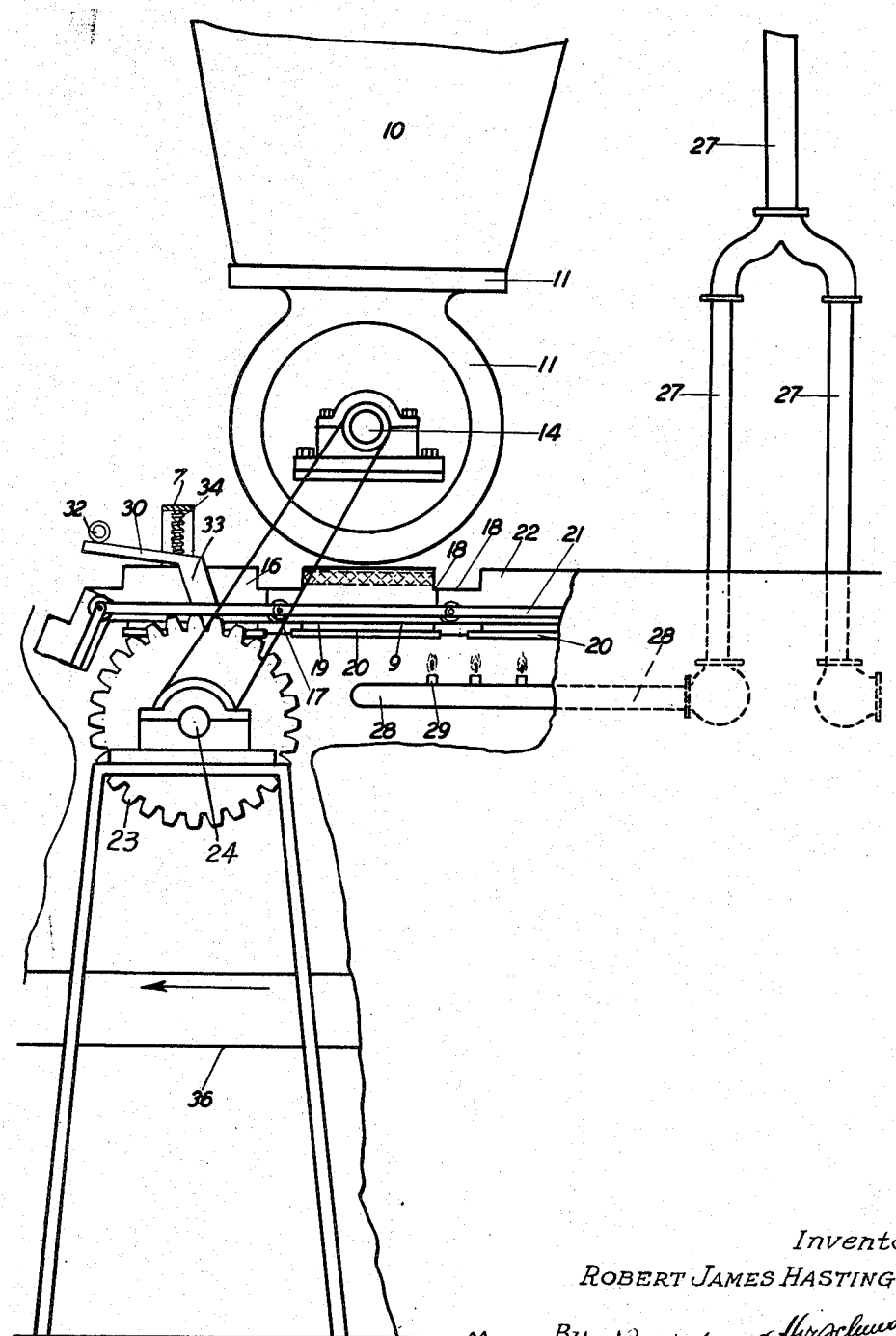
Figure 1 is a diagrammatic view of the machine illustrating the various operations involved according to the present invention.

The connecting pins 17 receive links 21 and rollers 22 (see Figures 1, 2 and 3) which form a driving chain, the assembled machine having one such driving chain on each side thereof so that the various banks of moulds 16, pins 17, links 21 and rollers 22, form a conveyor belt unit, the said driving chains of which have sprockets 23 engaging therewith, the said sprockets 23 being secured to shafts 24 mounted in bearings of known form and receiving rotary motion from a driving unit at each end and on opposite sides of the assembled machine which comprises a known electric motor 25 and a known reduction gear box 26, and the said conveyor belt may be supported by having the rollers 22 running on angle iron 9, and rail 8, as illustrated diagrammatically in Figures 1 and 1 (continued) and which extend longitudinally with respect to the machine beneath rollers 22 and support the upper and lower runs of the chain.

Figure 4:
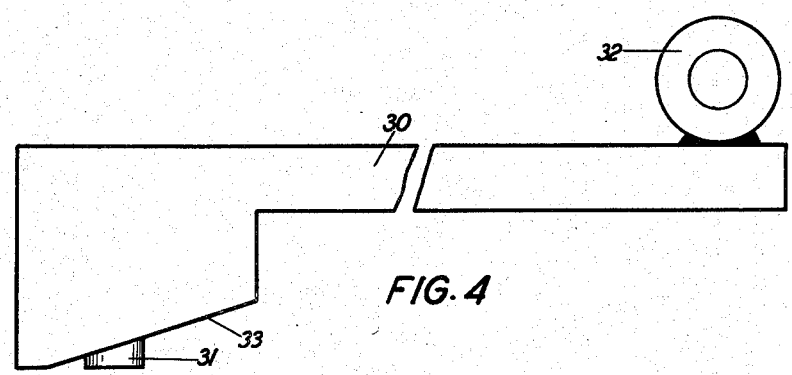
Figure 4 is a side elevational view of the mould depressing weight.
Figure 5:
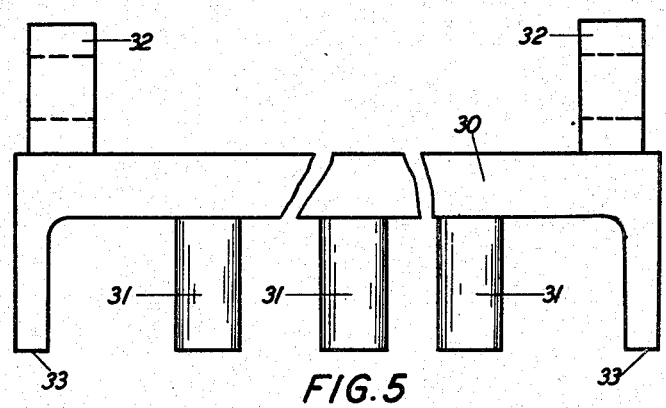
Figure 5 is an end view thereof.

Fuel supply pipes 27 have branch pipes 28 secured thereto in known manner and burners 29 are secured to the said branch pipes 28 for supplying heat to loaded crumpet moulds 16 passing thereover, whilst a weight member 30 having ejector pins 31, see Figures 4 and 5, is pivotally secured to the side walls of the machine by a shaft (not shown) which is received in lugs 32 formed integrally with the said weight member 30, which also has cams 33 formed integrally therewith for engagement by the rollers 22. Movement of the weight member 30 may also be assisted by a compression spring 34, Figures 1 and 1 (continued), said compression spring being disposed between a bridge member 7 fixed to the rail 8 and the weight member 30.

Figure 10:
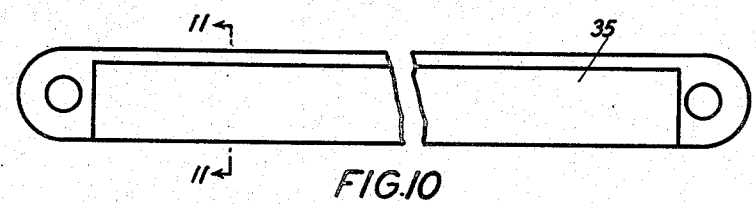
Figure 10 is a plan view of the knife.
Figure 11:
Figure 11 is a sectional elevation on the line 11—11 of Figure 10.

A knife, see Figures 1, 10 and 11, is rigidly secured to the side walls of the machine and is adapted to engage the faces of the respective mould valves or bases 19 to remove baked crumpets therefrom, and a second conveyor belt 36 of known form passes beneath the said knife 35 and is driven in known manner (not shown) from the respective driving units 25, 26, one of the said drive means 25, 26, being also adapted to drive the shaft 14 of the dispensing means 11.

In operation, dough is received from the hopper 10 by the dispensing means 11 through the holes formed in the bottom of the said hopper 10, the said holes corresponding in number to the number of moulds 16 which can be "served" at one time by the said dispensing means 11, for example, three. As the "bank" of three moulds 16 passes beneath the dispensing means 11, a predetermined quantity of dough falls into each mould 16 from the outlet ports 15, and the moulds 16 then pass over a series of gas burners 29 or the like. On reaching the end of the traverse of the machine, the moulds 16 are turned under the branch pipes 28 and burners 29 by the driving chains, and travel in an inverted position in the opposite direction, whereupon the rollers 22 engage the cam faces 33 of the weight 30, and raise the said weight 30 clear of the flanges 20 of the valves 19 of the respective moulds 16 until such time as the ejector pins 31 of the weight 30 are directly over the said valves 19, when the weight 30 then falls and the pins 31 force the respective valves 19 down, see Figure 1, and the knife 35, engages the faces of the respective valves 19 and cuts the baked crumpets therefrom, and the said crumpets fall on to the lower conveyor 36 and are carried to a suitable packing room, and prior to the empty moulds again passing beneath the dispenser 11, the weight member 30 situated at that end of the machine (see Figure 1), operates as described above to force the respective flanges 20 of the valves 19 away from their respective moulds 16, so that further portions of dough can fall therein, see Figure 1, and the cycle of operations continues.

I claim:

1. A machine for the manufacture of crumpets comprising, a plurality of moulds each having a body portion and a sliding valve portion disposed within said body portion, which, together form a moulding cavity, said moulds being linked together in endless chain like formation, rollers on said moulds, ejecting means acting upon the sliding valve portion of the respective moulds and comprising a weight member having ejecting pins and cam faces which latter are engaged by the rollers carried on the moulds whereby the ejecting pins are raised and lowered at predetermined intervals to permit unrestricted movement of the moulds.

2. A machine for the manufacture of crumpets as claimed in claim 1, including a severing means engaging the moulds for severing the baked product from the moulds.

3. An apparatus for the baking of food products comprising a dough receiving mold, said dough receiving mold having a body portion with an aperture therein and a valve portion slidably mounted within said aperture, the walls of said aperture forming the sides of the dough receiving pocket of the mold and one face of the valve forming the floor of said pocket when in one extreme position, and being flush with the mouth of said aperture when in the other extreme position, cam means on said mold, a weight member, means to move said mold along a predetermined path, said weight member being positioned adjacent said path and said cam means being positioned to engage said weight member and raise it above said valve and then to disengage from said weight member permitting said weight member to fall to engage and actuate the valve.

4. An apparatus for the baking of food products as claimed in claim 3 wherein the face of said valve portion forming the floor of the dough receiving pocket is a single uninterrupted planar surface and including a knife positioned adjacent to the path of said molds and located to engage said planar surface removing the baked product therefrom.

5. An apparatus for the baking of food products as claimed in claim 3 including a second weight member similar to said first mentioned weight member, said second weight member being positioned on the side of the mold opposite the side of said first mentioned weight member.

6. A machine for the maufacture of baked food products comprising, dough receiving molds, said molds being linked together for movement in endless chain-like formation, said molds each comprising a body portion, said body portion having an aperture therein, a sliding valve portion slidably mountd within said aperture, the walls of said aperture and one face of said sliding valve portion forming a molding cavity, ejecting means adapted to act upon the sliding valve portion of the molds, said ejecting means comprising a weight member having ejecting pins and cam faces, cam members on said molds, said cam members adapted to engage said cam faces causing said weight member to be raised and lowered at predetermined intervals.

7. A machine for the manufacture of baked food products as claimed in claim 6, including severing means, said severing means comprising a knife positioned to engage the face of said sliding valve portion which forms a part of the molding cavity, thereby severing the baked products from the molds.

ROBERT JAMES HASTINGS.

References Cited in the file of this patent

UNITED STATES PATENTS

| Number | Name | Date |
| --- | --- | --- |
| 990,577 | Mayle et al. | Apr. 25, 1911 |
| 1,128,407 | Carpenter | Feb. 16, 1915 |
| 1,136,261 | Pierce | Apr. 20, 1915 |
| 1,165,035 | Streit | Dec. 21, 1915 |
| 1,289,209 | Lewison | Dec. 31, 1918 |
| 1,426,756 | Mininberg | Aug. 22, 1922 |
| 1,984,027 | Lyons | Dec. 11, 1934 |
| 2,071,434 | Sarnmark | Feb. 23, 1937 |